April 18, 1939. C. W. GANNETT 2,154,932

WHEEL

Original Filed Oct. 15, 1934

Inventor
Chauncey W. Gannett,
Slough and Canfield
Attorney

Patented Apr. 18, 1939

2,154,932

UNITED STATES PATENT OFFICE

2,154,932

WHEEL

Chauncey W. Gannett, Wellington, Ohio, assignor to Wellington Machine Company, Wellington, Ohio, a corporation of Ohio Original application October 15, 1934, Serial No. 748,361. Divided and this application September 22, 1936, Serial No. 102,004

5 Claims. (Cl. 301—19)

This invention relates to wheels and particularly to wheels of the class adapted to be used on industrial trucks and the like having removable tires.

Among the objects of the invention are:

To provide generally an improved wheel of the class referred to;

To provide, in a wheel of the class referred to, an improved means for securing a rim of the wheel to a central wheel structure;

To provide a wheel of the class described having a removable tire supporting rim and constructed and assembled in a manner to facilitate removal of the tire for renewal purposes;

To provide a wheel of the class referred to in which a rim is secured to the central portion of the wheel by outwardly radially exerted thrusts, and having improved means for exerting said radial thrusts, and having improved means for relieving the radial thrusts to permit the rim to be readily detached from the central portion of the wheel.

Other objects will be apparent to those skilled in the art to which my invention appertains.

My invention is fully disclosed in the following description taken in connection with the following drawing in which.

The subject matter of this application is divisional from my co-pending patent application, Serial No. 748,361 filed October 15, 1934 for improvements in Wheels and subject matter illustrated and described in this application but not claimed herein is claimed in the said co-pending application and notice of and reference thereto is hereby given.

Figure 2:
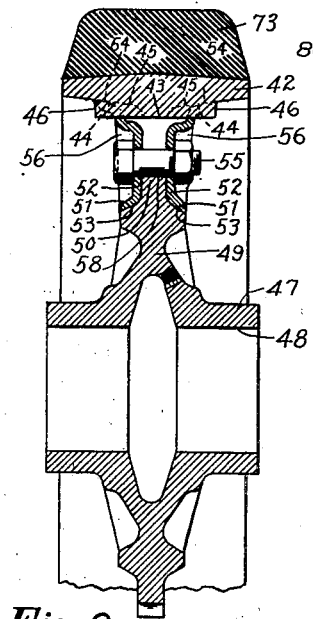
Fig. 2 is a fragmentary cross sectional view of the wheel of Fig. 1.
Figure 1:
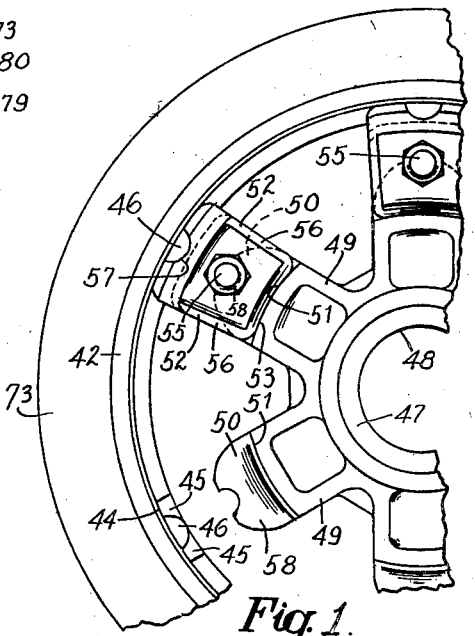
Fig. 1 is a fragmentary side elevational view of a wheel embodying my invention in one form.

Referring to the drawing, Figs. 1 and 2, I have shown at 42 the wheel rim, preferably rigid and preferably made from cast metal and at 73 the tire thereon. The tire is preferably made from rubber or like cushioning material and may be secured on the rim by any suitable means not constituting an essential part of this invention.

A tongue or rib 43 extends inwardly radially from the rim and is preferably a continuous tongue extending annularly entirely around the rim although as will presently appear it is not essential that it be continuous. The rim 42 is provided with opposite surfaces 44—44 of generally frusto-conical form with respect to the wheel axis and disposed at spaced points around the rim although, for convenience of manufacture, the frusto-conical surfaces 44—44 may be continuous annular surfaces. The tongue 43 is provided at spaced points around the rim with concave surfaces 45—45 and intermediately thereof, outwardly axially extending projections 46—46.

The central structure of the wheel comprises a central hub portion 47 having therein a bore 48 for receiving any suitable construction of bearing; and a plurality, such for example as six stub spokes 49—49 extend radially from the hub portion 47 and terminate each in a radially outwardly extending tongue 50. On axially opposite sides of the tongue 50, the stub spokes 49—49 are provided with opposite generally frusto-conical surfaces 51—51. The central structure of the wheel thus described is preferably substantially rigid and formed from cast metal.

A pair of clip devices 52—52 is provided in the nature of extensions for each of the stub spokes 49. The clip devices 52 may be conveniently press formed from sheet metal and are so illustrated in the form of Figs. 2, 3 and 4, and each is provided with a frusto-conical face 53 adapted to seat upon the frusto-conical surfaces 51—51. The radially outer ends of the clip devices 52 are similarly provided with generally frusto-conical faces 54—54 adapted to engage the frusto-conical surfaces 44—44. Bolts 55 extend through aligned perforations in the clip devices for drawing them toward each other.

Preferably, but not essentially, the faces 54 of the clip devices are inclined at an angle with the surfaces 44 of the rim of 1° or more when the clip devices are in position to be drawn together, and upon drawing up the bolts 55 these faces are drawn into wedging engagement with the surfaces in the nature of a wedging action exerting outward radial thrust on the rim 42 and inward thrust on the stub spokes 49 which rigidly mount the rim on the spokes.

Figure 4:
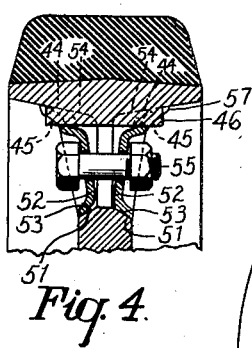
Fig. 4 is a fragmentary cross sectional view illustrating a step of the process of assembling the wheel of Fig. 2 or the wheel of Fig. 3.

In assembling the parts as just described, the clip devices may first take up the positions illustrated in Fig. 4 and then may be drawn into their final positions by the bolts 55. The clip devices 52, as shown in Fig. 4, rest upon the spoke surfaces 51—51 at their inner ends and when the bolts 55—55 are drawn up, they rock at their upper ends inwardly into their wedging positions.

As an alternative mode of operation, in connection with Fig. 4, the clip devices 52 may be disposed more nearly vertically than shown in that figure and then upon drawing up the bolts 55, not only will the faces 54 move with a wedging movement over the surfaces 44—44 of the rim but also the faces 53 of the clip devices will move with a wedging movement over the surfaces 51 of the spokes. The clip devices 52 may be resilient throughout or the outer ends providing the faces 54 only may be resilient and the more inwardly radially disposed portions may be strengthened for example, by ribs 56.

The clip devices besides mounting the rim on the inner wheel structure, function as part of the spokes and transmit load from the hub to the rim.

In the use of wheels of this general class, when the tire 73 has become worn or broken, it becomes desirable to change it by removing as a unit the rim and the tire thereon. At that time it is therefore necessary to remove the clip devices 52—52. I have found that if the angular inclination as viewed in Figs. 2 and 4, of the generally frusto-conical rim surfaces 44—44, is too small, that is to say makes too small an angle with the wheel axis, and if the spoke surfaces 51—51 make too small an angle with the wheel axis, it becomes very difficult to remove the clip devices 52—52 because, the wedging engagement of the clip devices with said surfaces will cause them otherwise to become locked therewith and in the effort to unlock them and break them apart, one part or another of the wheel will be mutilated. On the other hand, if the angular inclination referred to is too great, the clip devices will resist being wedgingly drawn thereover and may themselves be bent or distorted when that is attempted by drawing up the bolts 55, and also an insufficient wedging action will be effected to hold the parts of the wheel together in a rigid structure. Again, if the angular inclination of the said surfaces on the rim and spokes is suitably provided, then the corresponding angular inclination of the faces 54 and 53 must likewise be suitably predetermined. If the said angle thereof is too great, the entire wedging check will be applied at the axially outer edges of the clip devices and may mutilate them when the bolts are drawn up and if the angular inclination of the faces 54 and 53 is too small, the engagement of the faces and surfaces will not be upon any substantial area but will be concentrated in small areas and therefore will resist the movement of the clip devices to their final wedging position.

By making repeated tests, I have found that if the angular inclination of the surfaces 44 and 51 is not substantially less than 7°, a suitable wedging action will be effected without undue liability that the clip devices will lock with the rim and bolts when it is desired to remove them to remove the rim. In some cases as will more clearly hereinafter appear, the clip devices may be rigid throughout and in such cases, their corresponding faces 54 and 53 will have separately the same angular inclination as the surfaces 44 and 51; but when it is desired that the clip devices or the upper end portions only are resilient so that the upper end portions of the clip devices may yield, as the clip devices are drawn home, I have found that a suitable amount of yielding of the flanges will result if the inward axial divergence of the faces 54 and the surfaces 44 is not substantially less than 1° nor more than 5°.

If these limits are adhered to, the clip devices, when they are drawn up by the bolts will effect a rigid wedging action as above described and when the bolts are loosened, the clip devices may readily be removed or will simply drop out.

The radially outer ends of the clip devices 52 are provided with a notch 57 adapted to intermesh with the projection 46; and similarly the outer ends of the tongue 50 may be provided with notches 58 to intermesh with the body of the bolts 55 as shown in Fig. 1. By this means, the clip devices are insured from being shifted circumferentially with respect to the rim and also with respect to the stub spokes; and the symmetrical positioning of the clip devices on the spoke ends when assembling the wheel is insured.

Figure 6:
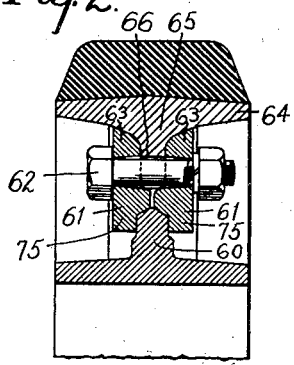
Figs. 5 and 6 are respectively fragmentary elevational and fragmentary cross sectional views of a wheel embodying my invention in another form.
Figures 5, 7:
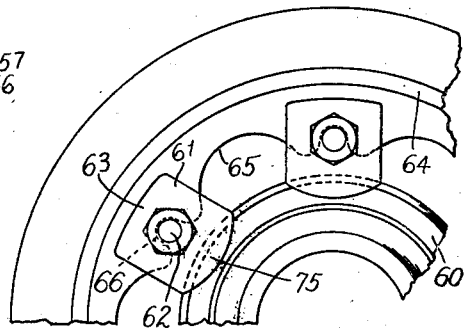
Figs. 7 and 8 are respectively fragmentary elevational and cross sectional views of the wheel embodying my invention in still another form.

In the form of my invention illustrated in Figs. 5 and 6 a smaller diameter wheel is shown in which instead of employing stub spokes, an annular rib 60 is provided. In this form, relatively rigid clip devices 61—61 are illustrated clamped toward each other by a bolt 62 to wedge the outer end portion 63 of the clip devices upon the inner surface of the rim 64 and to wedge the inner end portions 75 of the clip devices upon the rib 60. As shown in Fig. 5, the rib or tongue 65 of the rim 64 has radially inwardly open notches 66 embracing the bolt 62 and by this means the clip devices 61 are prevented from circumferential shifting.

It will be noted that in the form of Figs. 1 and 2, above described, the tongue 50 of the spoke extending outwardly to and partly around the bolt 55 provides a stop between the two clip devices to limit the proximity to which they may be drawn together; and that in Fig. 4 which illustrates the mode of operation of the clip devices of Figs. 1 and 2, such stop is omitted, this figure being therefore illustrative of a modification.

Figure 3:
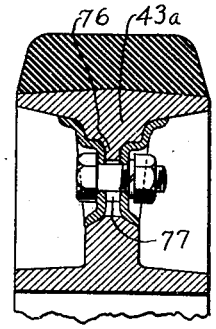
Fig. 3 is a fragmentary view similar to a part of Fig. 2 but illustrating a modification.

In Fig. 3 another form of stop is illustrated comprising an inwardly extending rib 76 on the tongue 43a (corresponding to the tongue 43 above described). the tongue 76 having recesses 77 therein (Fig. 3) corresponding to the recesses 66 described in connection with Fig. 5. In the form of Fig. 3, the surfaces 45 and projections 46 have been omitted.

Figure 8:
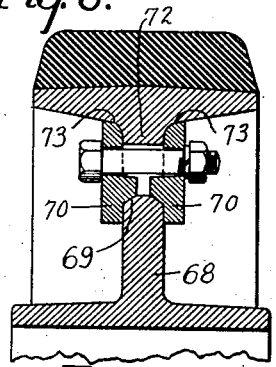

In Figs. 7 and 8 is illustrated a simple form in which the inner wheel element is provided with an annular rib 68 having substantially frusto-conical surfaces 69 thereon for wedgingly receiving the radially inner ends of clip devices 70—70, and the rim 71 has an annular tongue 72 thereon provided with substantially frusto-conical surfaces 73—73 on each side thereof for receiving the upper ends of the clip devices 70—70. This form is simplified in that no provision is made to prevent circumferential shifting of the clip devices on the rim or hub supporting structure.

Figure 9:
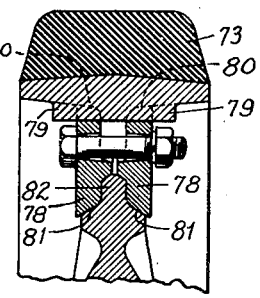
Fig. 9 is a view generally similar to Figs. 6 and 8 but illustrating a modification thereof.

In the form illustrated in Fig. 9, clip devices 78—78 are employed, formed at their upper ends similarly to the clip devices 52 of Fig. 1 and meshed with projections 79—79 and wedging upon substantially frusto-conical surfaces 80—80 on the rim and 81—81 on the central portion of the wheel, this form therefore being similar to the form of Fig. 1 except for the fact that the clip devices 78—78 are relatively more rigid and that a rib 82 on the hub structure projects upwardly between the clip devices and serves as a stop therefor.

From the foregoing, it will be apparent that my invention may be practiced with substantially rigid clip devices as in Figs. 6, 8 and 9 or with clip devices as in Figs. 2, 3 and 4 which have resilient portions engaging the rim surfaces; and as will be understood by those skilled in this art, sheet metal clip devices may be made substantially as rigid as the solid cast metal clip devices of Figs. 6, 8 and 9 without resilient portions. When rigid clip devices are desired, they are preferably made from cast metal.

In the forms of Figs. 5 and 7, the surfaces on the rim and central or hub structure will preferably be annular for the ease of forming them but, as will be understood, this is not essential, it being sufficient that there be surfaces as described hereinbefore at the point circumferentially around the wheel at which the devices engage the rim and the inner hub structure.

In assembling the wheel parts together, it is preferable but not essential that the clip devices be rocked around their radially inner end portions during the drawing up of the bolts and the exerting of the wedging action. By providing the stop means, such as the tongues or ribs 50, 60, 68, 76 and 82, above described, insurance is provided that when the clip devices are drawn up tight to secure the rim to the inner hub structure, the rim will be secured in a relatively axial position with respect to the hub structure. That is to say, the rim will not be axially offset with respect to the inner structure.

While I have hereinbefore described various surfaces, as substantially frusto-conical, it will be understood that this is a general term and that the said surfaces may, in fact, be curvilinear throughout, in section, inasmuch as curved surfaces will exert the wedging action above attributed to the frusto-conical surfaces.

As will be apparent from the foregoing description, the clip devices may be disposed generally parallel to each other and drawn toward each other by the bolts, thereby effecting a sliding wedging action both on the rim and on the wheel center as the clip devices move to their final position; or, the clip devices may be substantially seated in their final positions on the wheel center and rocked therearound effecting sliding wedging engagement on the rim; or the clip devices may be substantially seated at their rim end and rocked therearound, effecting a sliding wedging action of the clip devices on the wheel center. In either of the last two mentioned modes of operation, substantially all of the wedging sliding action is effected at one end of the clip device.

Although I have shown and described modifications of my invention, I contemplate that numerous and extensive departures may be made therefrom without departing from the spirit of my invention and the scope of the appended claims.

I claim:

1. In a wheel, a rim having portions on the inner face thereof tapering radially inwardly towards the median plane of the rim, a central wheel body comprising a hub and portions extending radially outwardly therefrom, a plurality of pairs of clip devices disposed around the body between the body and rim, constituting the sole means of transmitting loads between the body and rim, the radially outwardly extending portions of the wheel body acting as stops maintaining the radially inner ends of the clip devices axially spaced and about which the clip devices may pivot, and securing means for the clip devices comprising bolts loosely projected through aligned perforations provided in each pair of clip devices and nuts engaging the bolts to draw the radially outer ends of the bolts towards each other to engage the tapered portions of the rim.

2. In a wheel, a rim having portions of the inner face thereof tapering radially inwardly towards the median plane of the rim, a central wheel body comprising a hub and portions extending radially outwardly therefrom terminating in peripheral faces tapering radially outwardly toward the median plane of the rim, a plurality of pairs of clip devices disposed around the body and between the body and rim, constituting the sole means of transmitting loads between the body and rim, the radially outwardly extending portions of the wheel body acting as stops maintaining the radially inner ends of the clip devices axially spaced and about which the clip devices may pivot, securing means for the clip devices comprising elements projected through aligned perforations in the clip devices larger than the elements and abutments movable axially of the elements to draw the radially outer ends of the clip devices towards each other to wedge the clip devices between the tapered portions of the rim and the faces of the wheel body.

3. In a wheel, a rim having a plurality of axially aligned pairs of pockets formed on the inner face of the rim, the wall of each pocket tapering radially inwardly toward the central portion of the rim, a wheel body comprising a hub and radially outwardly extending portions, a plurality of pairs of clip devices having their radially inner ends engageable with and spaced by the radially extending portions of the wheel body whereby the clip devices may pivot about their inner ends, the radially outer ends of the clip devices being disposed in the rim pockets, each pair of clip devices being provided with axially aligned perforations therethrough, and clamping means loosely projected through said perforations for drawing the outer ends of the clip devices towards each other to wedgingly secure the clip devices between the wheel body and rim.

4. In a wheel, a rim having portions of the inner face thereof tapering radially inwardly towards the median plane of the rim, a central wheel body comprising a hub and a radially outwardly extending flange having peripheral portions tapered radially outwardly, a plurality of pairs of clip devices disposed in spaced relation around the wheel body and between the wheel body and rim, the clip devices being adapted to be axially spaced by the wheel body flange whereby they may pivot about their radially inner ends, and means for drawing the radially outer ends of each pair of the clip devices together to wedge the clip devices between the wheel body and rim comprising elements loosely projected through the clip devices at a point substantially spaced from the radial inner ends of the clip devices.

5. In a wheel, a rim having portions of the inner face thereof tapered radially inwardly towards the median plane of the rim, a central wheel body comprising a hub and radially extending portions tapered at their periphery radially outwardly, a plurality of pairs of clip devices disposed between the wheel body and rim with their radially inner ends spaced by the wheel body whereby the clip devices may pivot about said ends, securing means comprising elements loosely projected through aligned perforations provided in each pair of clip devices to draw the radially outer ends of the clip devices into wedging engagement with the rim, and abutment means on the rim engageable with the securing means to prevent circumferential movement of the clip devices relative to the rim.

CHAUNCEY W. GANNETT.